United States Patent [19]

Cannady, Jr. et al.

[11] Patent Number: 4,480,001

[45] Date of Patent: Oct. 30, 1984

[54] ANTISTATIC LAMINATES CONTAINING METAL SALTS

[75] Inventors: Daniel L. Cannady, Jr., Allendale; Halbert Mungin, Varnville, both of S.C.

[73] Assignee: Westinghouse Electric Corp., Pittsburgh, Pa.

[21] Appl. No.: 538,036

[22] Filed: Sep. 30, 1983

[51] Int. Cl.³ .............................................. B32B 3/00
[52] U.S. Cl. .................................... 428/284; 428/290; 428/298; 428/511; 428/922
[58] Field of Search ............... 428/171, 172, 173, 242, 428/283, 328, 284, 189, 298, 922, 290, 511

[56] References Cited

U.S. PATENT DOCUMENTS

| | | | |
|---|---|---|---|
| 3,040,210 | 6/1962 | Charlton et al. | 428/298 |
| 3,515,580 | 6/1970 | Eastes | 428/298 |
| 4,061,823 | 12/1977 | McCaskey et al. | 428/318 |
| 4,237,194 | 12/1980 | Upson et al. | 428/922 |
| 4,301,040 | 11/1981 | Berbeco | 252/511 |
| 4,307,144 | 12/1981 | Sanders et al. | 428/922 |
| 4,363,071 | 12/1982 | Rzepecki et al. | 428/922 |
| 4,371,579 | 2/1983 | McCaskey et al. | 428/328 |
| 4,379,553 | 4/1983 | Kelly | 428/242 |

Primary Examiner—James J. Bell
Attorney, Agent, or Firm—D. P. Cillo

[57] ABSTRACT

A static-dissipating laminate is made, containing at least a bottom core layer and a top decorative layer, both layers containing fibrous material which is impregnated with a resin, where at least the decorative layer has a metal salt distributed through it in an amount effective to provide an antistatic effect to the laminate, so that static charges accumulating on the top of the decorative layer are dissipated.

11 Claims, 2 Drawing Figures

ANTISTATIC LAMINATES CONTAINING METAL SALTS

BACKGROUND OF THE INVENTION

It is well known that if two surfaces of insulating materials are rubbed together and then separated, an electrostatic charge will build up between the two surfaces. In recent years, this problem in computer room flooring and desk areas has been troublesome, since the discharge of built-up static can result in tape or disc erasures and interference with sensitive equipment. Such charged surfaces in hospital surgical, and other areas where certain anesthetic gases can form violently explosive mixtures with air, has caused even greater concern that the chances of explosions caused by sparks or electrical discharges be minimized. In all of these cases, the static build-up can be caused by walking on flooring, moving electronic components or other equipment from place to place, and even utilizing the keyboard on a computer terminal. Such static build-up can also occur over a period of time in the wearing apparel of workers.

Charlton et al., in U.S. Pat. No. 3,040,210 recognized these problems, and taught resilient, decorative, carbon containing, linoleum floor sheeting, laminated to a conductive base. The linoleum surface sheeting contains from 1 percent to 14 weight percent conductive carbon, homogeneously mixed with other conductive materials, binder, and sufficient coloring pigments to provide an attractive appearance. The conductive backing must contain from 10 percent to 35 weight percent conductive carbon, and can be bonded to fabric for added strength, where the fabric itself can be made conductive by initially dipping it in a dispersion of conductive carbon. This provides a static resistant flooring having a controlled electrical resistance, which will wear evenly, can be applied in long sections minimizing seams, and which is resilient enough to help reduce fatigue for people that must stand or walk on the flooring for long periods of time.

Eastes, in U.S. Pat. No. 3,515,580, taught antistatic coating solutions or emulsions that can be used on polymeric surfaces, such as films, tubing and other solid structures. These surface coating solutions or emulsions contain a mixture of urea; a selected metal salt, such as lithium chloride, lithium nitrate, zinc chloride, zinc acetate, magnesium bromide, magnesium nitrate, and aluminum hydroxy diacetate, among many others, and preferably, sodium nitrate, sodium acetate or potassium acetate; wetting agent, such as an alkyl diester of sulfosuccinic acid; and a carrier, such as water. p Berbeco, in U.S. Pat. No. 4,301,040, taught static-free mats containing a standard, non-conductive decorative laminate, such as a 0.16 cm. (1/16 in.) thick melamine-formaldehyde laminate, or a rubber, nylon, polycarbonate, polyethylene or polypropylene, non-conductive sheet, as a top surface, adhesive bonded to, or coated with, either an electrically conductive solid or an open cell foam bottom backing layer. The bottom layer includes a polymeric material or a foam and an antistatic amount, generally about 2 percent to 40 weight percent, of conductive particulate material, such as metal particles, aluminum salts such as aluminum silicate, graphite fibers, and preferably carbon black particles. Useful polymeric materials include butadiene-styrene resin and the like, and useful foams include polyurethane foams, polyester foams and the like. When a foam is used as the bottom layer, a flexible cushion mat results.

Standard decorative laminates are non-conductive through their cross-section, and are described, for example, by McCaskey, Jr. et al., in U.S. Pat. No. 4,061,823. They are popular as surfacing material for counter and furniture tops. Because, in many cases, they must be machined, fillers other than coloring pigments are usually avoided. Such laminates generally contain 2 to 6 fibrous, Kraft paper sheets, impregnated with phenol-aldehyde resin, as a core for 1 high quality, fibrous, alpha-cellulose decorative print sheet, having a pattern or plain color, impregnated with melamine-aldehyde resin, and 1 top, high quality, fibrous, alpha-cellulose overlay protective sheet, also impregnated with melamine-aldehyde resin. Any pigmentation fillers would only be present in the decorative print sheet.

The Charlton et al. material requires use of large amounts of relatively expensive carbon, and requires a complicated manufacturing process. The Eastes surface coating would be prone to wear off any surface subject to hard use, and the Berbeco material requires a non-conductive surface, through which the backing would have to draw static charges. Of course, standard decorative laminates are usually non-conductive. What is needed is a surfacing material having oustanding antistatic properties, good wear properties, and an attractive appearance, and which is also inexpensive, easy to manufacture, and thin enough to allow ease of installation.

SUMMARY OF THE INVENTION

The above needs have been met, and the above problems solved, by providing a static-dissipating, high pressure decorative laminate, having a metal salt, preferably selected from dehydrated magnesium nitrate, lithium nitrate, lithium chloride, potassium chloride, zinc chloride, and most preferably, sodium chloride or aluminum chloride, uniformly distributed throughout the fibrous overlay and print layers, and preferably also contained in the fibrous core layer of the laminate.

In a preferred embodiment, the thermosetting resin used to impregnate the overlay and print sheets, as well as the thermosetting resin used to impregnate the core sheets, will contain from about 0.15 weight percent to 10 weight percent of aluminum chloride-based on resin solids. In this preferred embodiment, both surface resistivity and volume resistivity can be lowered dramatically. In another embodiment, the overlay, print and core sheets themselves will have aluminum chloride distributed throughout their cross-section, in addition to the aluminum chloride used in the impregnating resins.

These laminates will generally have antistatic properties through at least $\frac{1}{4}$ of their thickness, and preferably throughout their entire thickness, and do not rely on either a surface treatment or a highly conductive extra bottom backing layer for static reduction. In addition, these laminates wear well, can be applied in large area sheet form, are thin, inexpensive, and allow ease of manufacture.

BRIEF DESCRIPTION OF THE DRAWING

For a better understanding of the invention, reference may be made to one embodiment exemplary of the invention, shown in the accompanying drawings, in which.

DESCRIPTION OF THE PREFERRED EMBODIMENTS

Figure 1:
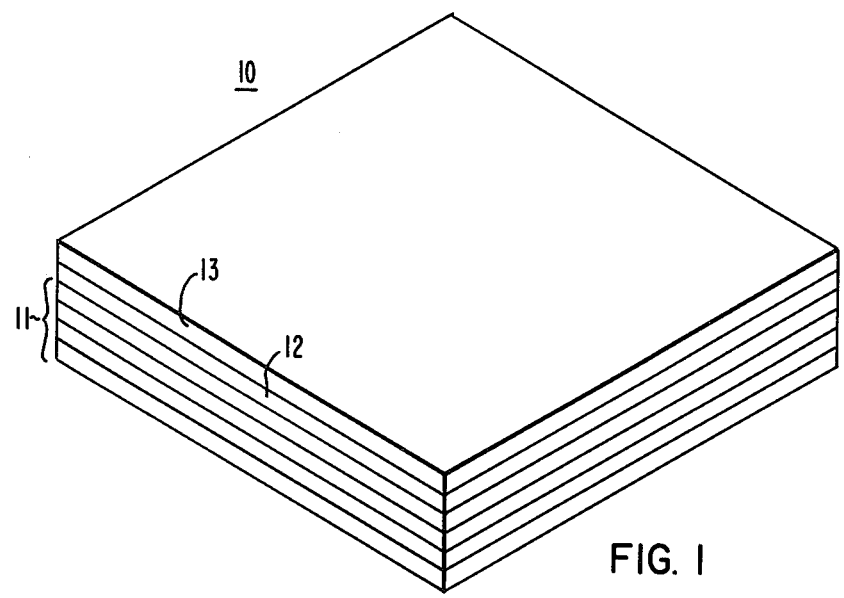
FIG. 1 shows a decorative static-dissipating surfacing laminate.

Referring now to FIG. 1 of the drawings, a laminate 10 comprises a lay-up of a plurality of resin impregnated core sheets 11, a superimposed resin impregnated decorative print sheet 12 and a protective overlay sheet 13. Heat and pressure are applied to this lay-up to consolidate the materials into a unitary decorative structure.

The overlay sheet 13 is preferably a thin fibrous sheet of high grade, absorbent alpha-cellulose or regenerated cellulose paper which has been impregnated with a thermosetting resin, such as a melamine-formaldehyde resin or other aminotriazine-aldehyde resin, urea-formaldehyde resin, thiourea-formaldehyde resin, unsaturated polyester resin, and the like. In selecting the resin for the overlay sheet, it is generally preferred to utilize the same resin or substantially the same quality of resin which has been used to impregnate the print sheet 12. The overlay sheet is not a necessary part of the laminating assembly, although it is generally used. It is substantially transparent when cured and protects the decorative layer.

The print sheet 12 usually provides the decorative effect for the laminate. It is usually in the form of a decorative sheet, i.e. dyed, pigmented to impart a solid color, or printed with a design, such as a wood or marble grain. It usually comprises a single fibrous sheet of high grade, absorbent alpha-cellulose or regenerated cellulose paper impregnated with a thermosetting resin, such as a melamine-formaldehyde resin or other aminotriazine-aldehyde resin.

The rigidity-imparting core stock layer is made of a plurality of fibrous sheets of Kraft paper, rag paper, or cotton linter fiber paper, or the like, containing phenolic resin such as a phenol-formaldehyde resin. Typically, 2 to 6 core sheets are consolidated with a single print and a single overlay sheet to form a conventional 0.16 cm. (1/16 in.) thick decorative laminate.

High pressure laminating techniques are employed in preparing the laminates from the above described assembly of core stock layer of core sheets, print sheet and overlay sheet. Temperatures ranging from about 120° C. to about 175° C. and pressures ranging from about 600 psi. to 2,000 psi. are employed. The time required, at these temperatures, to effect a cure of the resinous components of the assembly will usually be from about 3 minutes to about 25 minutes. The resulting laminate is generally allowed to cool to from about 50° C. to 85° C. before being removed from the press. The cooling step generally takes from about 30 minutes to 90 minutes. Generally, the assembly will require a 15 minute to 45 minute warm up period before the 120° C. to 175° C. maximum curing temperatures are reached in the press. The entire cycle of warm up, cure and cooling will vary from 50 minutes to 160 minutes.

The aminotriazine-aldehyde resins used to impregnate the overlay and print sheets are well known in the art, and reference may be made to U.S. Pat. No. 3,392,092 for exhaustive details on their production. Similarly, complete details on the phenolic resins used to impregnate the core sheet can be found in U.S. Pat. Nos. 2,205,427; 2,315,087; 2,328,592 and 2,383,430.

In the static-dissipating, heat and pressure consolidated laminate of this invention, selected metal salts are dispersed or dissolved in the impregnating resins to give antistatic properties to the laminate. Additionally, the selected metal salts can also be distributed throughout the various sheets of the laminate prior to resin impregnation. These methods will provide an antistatic, decorative laminate having a metal salt uniformly distributed throughout the overlay layer and print layer, and preferably also throughout the core layer. Useful metal salts are preferably selected from the group consisting of dehydrated magnesium nitrate, lithium nitrate, lithium chloride, potassium chloride, zinc chloride, and most preferably, sodium chloride or aluminum chloride, and mixtures thereof. The last two are most preferred, in part, because they are considerably less expensive than the others. These metal salts interact with and are tied up by the resin, so that no substantial leaching will occur upon exposure to water.

Figure 2:
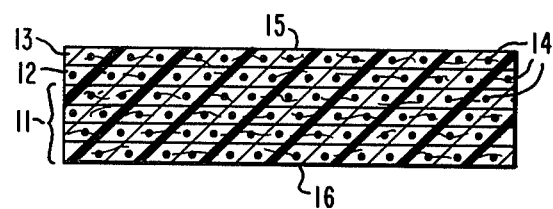
FIG. 2 shows a cross-sectional view of the laminate detailing the uniform distribution of selected antistatic material throughout its cross-section.

In the most preferred embodiment, shown in FIG. 2 of the drawings, the metal salt 14 will be uniformly distributed throughout the overlay layer 13, print layer 12, and core layer 11, to provide maximum reduction in volume resistivity. The distribution must be uniform and in an amount effective so that good electrical contact of the metal salt is assured, to provide electric static drain from the top surface 15 of the overlay layer and laminate. While not shown in FIG. 2 for the sake of simplicity, the metal components of the metal salt are in generally contacting relationship, providing a conductive path from top surface 15 to bottom surface 16 of the laminate.

In some instances, where a thin laminate is used, and where surface resistivity reduction is primarily desired, only the overlay layer 13 and the print layer 12 need contain the uniform distribution of the metal salt. In all instances, the laminate will be electrically conductive into its interior. As shown in FIG. 2, no backing layer is used or desired next to the core layer 11, at bottom surface 16, to provide or enhance conductivity.

Preferably, the thermosetting resin used to impregnate the various layers of the laminate will contain the metal salt. In these instances, the thermosetting resin will contain from about 0.15 weight percent to 10 weight percent, preferably from about 0.20 weight percent to about 5 weight percent, of the metal salt, based on resin solids. This provides an amount of metal salt effective to insure antistatic properties upon cure of the laminate. Over 10 weight percent metal salt in the resin, settling, dispersion and dissolution problems of the metal salt in the resin occur. Also, over 10 weight percent, the metal salts could initiate premature gellation effects on the resin, lowering its pot life. Under about 0.15 weight percent, little antistatic improvement is achieved. The metal salt can be added during preparation of the resin or after the resin has been made.

In some instances, where the metal salt is particularly active in gelling the impregnating resin, or where it causes dissolution or settling problems in the impregnating resin, the metal salt can be applied to the alpha-cellulose, Kraft paper, or other substrate sheets used in the laminate, during or after the paper felting process, to cause an effective distribution of metal salt within the unimpregnated sheet. However, in such instances, the impregnating resin would still include some metal salt, although perhaps at the lower end of the range hereinbefore described, to insure that the resin impregnation would not wash out too much of the metal salt included during sheet felting, and to insure a uniform and effective metal salt distribution.

In all cases, the weight ratio of metal salt: resin impregnated sheet weight for the overlay sheet, print sheet and each core sheet will preferably range from about 0.0016 to 0.0048:1, in order to generally insure intimate chain electrical contact of the metal component of the metal salts, and provide electrical static drainage from the laminate top surface into the interior of the laminate. In all cases, the standard ASTM-D257-54T surface resistivity will be at or below about $1 \times 10^6$ megohms, and when the metal salt is included in the laminate core, the standard ASTM-D257-54T volume resistivity will be at or below about $1 \times 10^5$ megohms. These laminates, can be used alone as a surfacing material, and can be easily applied in large sheet form to wood, concrete, or plaster, to provide superior, inexpensive, antistatic surfaces for computer room or hospital floors, walls, counters, and the like.

EXAMPLE 1

A conventional melamine-formaldehyde impregnating resin solution was made and split into three batches, Samples A, A′ and B. The Sample A batch was modified by slow addition, with constant stirring, of 2.0 weight percent of aluminum chloride ($AlCl_3$) based on melamine-formaldehyde resin solids, along with minor additions of guanidine carbonate to adjust the pH back to a normal value of 8. Sample A′ was made the same as Sample A but contained only 0.25 weight percent of aluminum chloride. Sample B was unmodified and was to act as a control sample. The three sample resin solutions were separately used to impregnate alpha-cellulose overlay and print paper by a conventional dip and squeeze process, to a resin to paper ratio of 1.75 to 1. All of the sheets were then dried to the "B"-stage, i.e., dry to the touch, non-tacky, but capable of cure to the "C"-stage. The aluminum chloride was uniformly distributed throughout the Sample A and A′ resin and the Sample A and A′ overlay and print sheets. No premature gellation of the Sample A or A′ resin was noted nor any settling problems.

The resulting three batches of treated overlay and print sheet material were each bottom plied with 6 sheets of conventional "B"-staged phenol-formaldehyde treated Kraft core paper. All of the stack-ups were then molded under 1000 psi. pressure at 135° C., to bond and consolidate the stack-ups into a unitary laminate. The laminate consisted of a top overlay, middle print, and six bottom core sheets. After cooling and press release, the Sample A and A′ laminates, such containing aluminum chloride uniformly distributed through the overlay and print layers, and the Sample B laminate control, containing no metal salt, were tested for surface and volume resistivity by the standard ASTM-D257-54T method. The results are shown in Table 1 below, where lower megohm values mean better laminate antistatic properties:

TABLE 1

| Sample | Wt. % Aluminum Chloride | Surface Resistivity Megohms | Volume Resistivity Megohms |
|---|---|---|---|
| A | 2.0* | $1 \times 10^5$ | $1 \times 10^6$ |
| A′ | 0.25* | $1 \times 10^6$ | $1 \times 10^6$ |
| B | 0.00 | $1 \times 10^9$ | $1 \times 10^6$ |

*$AlCl_3$ in overlay and print sheet impregnating resin.

As can be seen, Sample A′ showed a dramatic improvement in surface resistivity over control Sample B; and Sample A almost reduced surface resistivity of the control Sample B by one-half. Water boil tests were also run, and showed no substantial leaching of the metal salt from the overlay and print sheet.

EXAMPLE 2

The same formulations and procedure as described in EXAMPLE 1 was employed in making three sample laminates, Samples C, C′ and D, except Samples C and C′ had aluminum chloride addition in the phenol-formaldehyde resin used to impregnate the Kraft core paper. Sample C thus had 1 overlay sheet and 1 print sheet each impregnated with melamine-formaldehyde resin containing 2.0 weight percent of aluminum chloride ($AlCl_3$) based on resin solids, and 6 sheets of Kraft paper core each impregnated with phenol-formaldehyde resin containing 2.0 weight percent of aluminum chloride based on resin solids. Sample C′ had the same number of the same type sheets with the same resin in each type sheet but the melamine-formaldehyde resin and phenol-formaldehyde resin each contained 0.25 weight percent of aluminum chloride. Control Sample D was the same as control Sample B of EXAMPLE 1, where no aluminum chloride was used in either resin system. Standard ASTM-D257-S4T tests were again run, and the results are shown in Table 2 below, where lower megohm values mean better laminate antistatic properties:

TABLE 2

| Sample | Wt. % Aluminum Chloride | Surface Resistivity Megohms | Volume Resistivity Megohms |
|---|---|---|---|
| C | 2.0* | $1 \times 10^5$ | $1 \times 10^4$ |
| C′ | 0.25* | $1 \times 10^6$ | $2 \times 10^4$ |
| D | 0.00 | $1 \times 10^9$ | $1 \times 10^6$ |

*$AlCl_3$ in overlay, print and core sheet impregnating resin.

As can be seen, including aluminum chloride in the core sheets provided a dramatic improvement in both surface resistivity and volume resistivity over control Sample D.

In a similar fashion, Sample C′ laminates were made, but the aluminum chloride was added to the resin formulation during initial raw material charges in making the melamine and phenolic resins, rather than just adding the aluminum chloride at the end. The resistivity values were found to be altered little from the Sample C′ results by such a change in procedure.

Additionally, in a similar fashion, a laminate, Sample E, was made containing one melamine impregnated alpha-cellulose overlay sheet, one melamine impregnated decorative print paper, and 15 phenolic impregnated Kraft paper core sheets; where the melamine resin in the print paper contained 3.0 weight percent of sodium chloride, based on melamine resin solids, and the phenolic resin in the Kraft core sheet next to the print paper and the ninth Kraft core sheet away from the print paper contained 5.0 weight percent of sodium chloride, based on phenolic resin solids. Thus, two core sheets and the print paper were impregnated with sodium chloride containing resin. Standard ASTM-D257-S4T tests were again run and the results are shown in Table 3 below:

TABLE 3

| Sample | Wt. % Sodium Chloride | Surface Resistivity Megohms | Volume Resistivity Megohms |
|---|---|---|---|
| E | 3.0 print | $6.2 \times 10^3$ | $1.5 \times 10^4$ |

TABLE 3-continued

| Sample | Wt. % Sodium Chloride | Surface Resistivity Megohms | Volume Resistivity Megohms |
| --- | --- | --- | --- |
| | sheet 5.0 in two core sheets | | |

As can be seen, these results are equally as impressive as Sample C and C' of Table 2, and the other metal salts listed hereinbefore should give similar results, they are however substantially more expensive.

We claim:

1. A static-dissipating laminate comprising:
   (A) a bottom core layer, and
   (B) a top decorative layer disposed on the core layer, where the core and decorative layers comprise fibrous material which is impregnated with a resin, and where at least the decorative layer has metal salt distributed therethrough, in an amount effective to provide a conductive path and to dissipate static charges accumulating on the top of the decorative layer.

2. The static-dissipating laminate of claim 1, where the core contains a plurality of fibrous sheets, the resin impregnating the fibrous material is a thermosetting resin, the metal salt is selected from the group consisting of sodium chloride, aluminum chloride and mixtures thereof, and no additional conductive layer is attached to the bottom of the core layer.

3. A static-dissipating, electrically conductive decorative laminate comprising:
   (A) a bottom core layer,
   (B) a decorative layer disposed on the core layer, and
   (C) a top protective overlay layer disposed on the decorative layer, where the core, decorative and overlay layers comprise fibrous sheet material which is impregnated with a resin, and where all three layers have metal salt therein, selected from the group consisting of metal nitrates, metal chlorides, and mixtures thereof, in an amount effective to provide a static-dissipating, electrically conducting laminate, so that static charges accumulating on the top of the overlay layer are dissipated from the top surface to the bottom surface of the laminate.

4. The static-dissipating, electrically conducting laminate of claim 3, where the core contains a plurality of fibrous sheets, the resin impregnating the fibrous sheet material is a thermosetting resin, and the metal salt is selected from the group consisting of aluminum chloride, sodium chloride, dehydrated magnesium nitrate, lithium nitrate, lithium chloride, potassium chloride, zinc chloride and mixtures thereof, said metal salt providing a conductive path for static charges.

5. The static-dissipating, electrically conducting laminate of claim 3, where the metal salt is selected from the group consisting of sodium chloride, aluminum chloride and mixtures thereof.

6. The static-dissipating, electrically conducting laminate of claim 3, where no additional conductive layer is attached to the bottom of the core layer.

7. The static-dissipating, electrically conducting laminate of claim 3, wherein the resin impregnating the fibrous sheet material contains from about 0.15 weight percent to 10 weight percent of metal salt salt based on resin solids.

8. The static-dissipating, electrically conducting laminate of claim 3, where the resin impregnating the fibrous sheet material contains from about 0.20 weight percent to about 5 weight percent of metal salt based on resin solids.

9. The static-dissipating, electrically conducting laminate of claim 3, where the impregnating resin for the decorative and overlay layers is a melamine aldehyde resin, the impregnating resin for the core is a phenolaldehyde resin, and the metal component of the metal salt forms a conductive path from the top to the bottom of the laminate.

10. The static-dissipating, electrically conducting laminate of claim 5, where the metal salt is aluminum chloride, the resin impregnating the fibrous sheet material is a thermosetting resin containing from about 0.20 weight percent to about 5 weight percent of aluminum chloride based on resin solids, the surface resistivity of the laminate is at or below $1 \times 10^6$ megohms, and the volume resistivity of the laminate is at or below $1 \times 10^5$ megohms.

11. The static-dissipating laminate of claim 1, where the metal salt is selected from the group consisting of metal nitrates, metal chlorides, and mixtures thereof, and the resin impregnating the top decorative layer contains from about 0.15 weight percent to 10 weight percent of metal salt based on resin solids.

* * * * *